Figure 1:
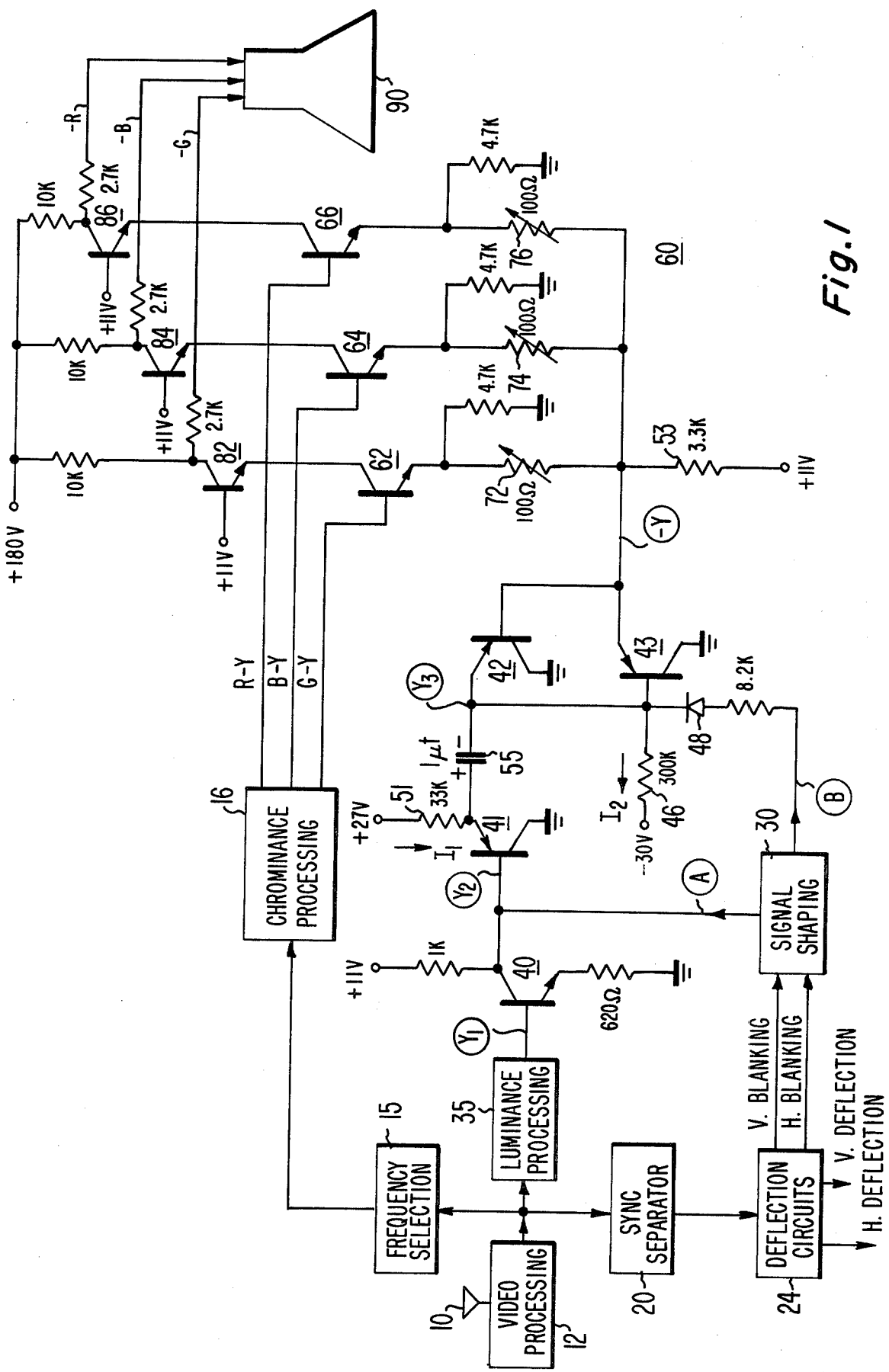

United States Patent [19]

Parker

[11] 4,110,787
[45] Aug. 29, 1978

[54] COMBINED BLANKING LEVEL AND KINESCOPE BIAS CLAMP FOR A TELEVISION SIGNAL PROCESSING SYSTEM

[75] Inventor: Robert Preston Parker, Indianapolis, Ind.

[73] Assignee: RCA Corporation, New York, N.Y.

[21] Appl. No.: 819,935

[22] Filed: Jul. 28, 1977

[51] Int. Cl.² .................. H04N 9/535; H04N 9/18; H04N 5/18
[52] U.S. Cl. .................................. 358/34; 358/65; 358/172; 358/242
[58] Field of Search ............... 358/171, 172, 242, 33, 358/34, 64, 65

[56] References Cited

U.S. PATENT DOCUMENTS

| | | | |
|---|---|---|---|
| 3,927,255 | 12/1975 | Yorkanis | 358/172 |
| 3,959,811 | 5/1976 | Shanley | 358/34 |
| 4,044,375 | 8/1977 | Norman | 358/172 |

Primary Examiner—John C. Martin
Attorney, Agent, or Firm—Eugene M. Whitacre; William H. Meagher; Ronald H. Kurdyla

[57] ABSTRACT

In a video signal processing system including a kinescope for reproducing an image in response to an image representative video signal, a circuit for clamping a periodic blanking level of the video signal to establish a black level for a reproduced image. A clamping device clamps the video signal to a reference voltage during periodic blanking intervals of the video signal. The clamped video signal is applied to the kinescope through a direct current coupling network having a threshold conduction level. A locally generated blanking reference signal, of a magnitude substantially equal to the difference between the reference voltage and the threshold conduction level, is added to the video signal prior to clamping, so that the clamped video signal coupled to the kinescope exhibits a desired blanking level and unimpaired peak-to-peak amplitude.

17 Claims, 7 Drawing Figures

COMBINED BLANKING LEVEL AND KINESCOPE BIAS CLAMP FOR A TELEVISION SIGNAL PROCESSING SYSTEM

This invention relates to blanking level signal clamping circuits for use in a television signal processing system such as a television receiver.

Television video signals comprise periodic image information portions separated by image blanking portions. The image information defines the gray levels of images displayed by an image reproducing device (kinescope) of the receiver. The blanking portion defines an interval for blanking the kinescope at the end of a horizontal image line during a horizontal retrace interval, and at the end of a group of lines, known as a field, during a vertical retrace interval. The blanking portion includes a blanking pedestal level and an image synchronizing (sync) pulse superimposed on the pedestal level. The blanking level approximates a black level and is often considered to correspond to a black tone of a reproduced image. It is therefore desirable that the kinescope generate a black tone when the amplitude of the video signal substantially equals the blanking level.

The video signal usually is coupled to the kinescope through several signal translating stages. When these stages are A.C. coupled or when the D.C. conditions of these stages vary, the blanking level of the video signal tends to shift. It is desirable to eliminate shifts of the blanking level and to clamp an appropriate portion of the video signal to a reference voltage which causes the kinescope to generate the black tone when the black level is suitably applied to the kinescope.

Clamping circuits for clamping a video signal to a reference voltage are known. Such circuits are disclosed, for example, in a copending U.S. patent application Ser. No. 715,851 of M. N. Norman entitled "Brightness Control Apparatus", filed Aug. 19, 1976, now U.S. Pat. No. 4,044,375, and in U.S. Pat. No. 3,927,255 (B. J. Yorkanis), both assigned to the same assignee as the present invention.

Since clamping circuits often operate to clamp the peak (either a maximum or minimum signal level) of a video signal to a reference level, means often are provided in blanking level clamping circuits employed in a television receiver to prevent clamping to the peak of the sync pulse, in order to avoid establishing a voltage which erroneously represents the black tone. This is often accomplished by disabling the clamp during the sync interval. As described in the aforementioned copending application of Norman and patent of Yorkanis, this can be accomplished by deriving a gating pulse coincident with the sync pulse, and applying the gating pulse to the clamp to render the clamp inoperative during the sync pulse interval. The gating pulse can be derived from sync separator or deflection circuits of the receiver. However, the timing of the gating pulse can be upset if the sync separator erroneously responds to noise or spurious signals, or if the output from the deflection circuits exhibits significant phase error.

Clamping circuits operatively associated with kinescope driver stages in a television receiver also are known. A clamp circuit of this type is described in U.S. Pat. No. 3,970,895 of D. H. Willis, assigned to the same assignee as the present invention. The clamp circuit described in the Willis patent is operative during the blanking interval to provide a reference bias level for stabilizing the operating point of the kinescope driver stages. Such a clamping arrangement serves to substantially reduce variations of the D.C. operating level of the driver stages which may be caused by temperature changes, variations of the D.C. level of color difference signals applied as inputs to the driver stages, or both.

It is desirable in a television signal processing system to provide a circuit arrangement capable of serving as both a blanking level clamp for establishing a desired black reference level of the video signal, and a kinescope bias level clamp for establishing a desired bias level for kinescope driver stages. It is moreover advantageous for such a clamping circuit arrangement to be substantially insensitive to the amplitude of the sync pulses, and to not require additional circuitry for generating a gating signal suitable for rendering the clamp inoperative during the sync pulse interval.

In accordance with the present invention, apparatus is provided in a video signal processing system including a kinescope for reproducing an image in response to an image representative video signal. The video signal includes periodic image blanking intervals disposed between periodic image intervals containing image information signals. The blanking intervals each contain a sync pulse superimposed on a pedestal blanking level. A clamping network clamps the video signal to a reference voltage during the blanking intervals. A coupling network having a threshold conduction level different from the clamping reference voltage couples the clamped video signal to the kinescope when the threshold level is exceeded. A source of periodic blanking reference pulses also is included. The reference pulses are coincident with the blanking intervals, and are of a magnitude substantially equal to the difference between the reference voltage and the threshold conduction level of the coupling network. The reference pulses are combined with the video signal prior to clamping.

In accordance with a feature of the invention, a signal coupling capacitor is operatively associated with the clamping network. The video signal is coupled to the capacitor via an input circuit including a transistor. The transistor is rendered non-conductive during the sync interval in response to the video signal coupled via the input circuit, for limiting the amplitude of the video signal during the blanking intervals to the blanking level. The sync pulse therefore is removed or stripped from the video signal which is coupled to the input of the capacitor.

FIG. 1 of the drawing shows, partially in block form and partially in schematic diagram form, a general arrangement of a color television receiver employing a clamping circuit constructed in accordance with the present invention; and FIGS. 2–7 of the drawing show signal waveforms useful in understanding the operation of the present invention.

Referring to FIG. 1, a video signal processing unit 12 responds to radio frequency television signals received by an antenna 10 for generating, by means of suitable intermediate frequency amplification and detection circuits (not shown), a composite video signal comprising chrominance, luminance and synchronizing signal portions.

The chrominance component of the video signal from unit 12 is selectively coupled via a frequency selection unit 15 to a chrominance signal processing unit 16 included in a chrominance channel of the receiver, for developing R-Y, B-Y and G-Y color difference signals.

A sync separator 20 serves to separate the synchronizing component from the video output signal of unit 12. The separated synchronizing component is applied to deflection circuits 24, which provide horizontal and vertical deflection signals for application to appropriate deflection windings (not shown) associated with a kinescope 90, and horizontal and vertical image blanking signals. The horizontal and verticl blanking signals are processed by a signal shaping and combining unit 30 to provide a combined vertical and horizontal reference blanking signal A (FIG. 6) at one output, and a clamping signal B (FIG. 7) at another output. Reference signal A comprises positive, periodic pulses of predetermined amplitude $V_B$ occurring during each horizontal blanking interval $T_B$ and each vertical blanking interval $T_V$, although reference pulses occurring during the vertical interval are not essential. Clamping signal B comprises positive, periodic pulses occurring during each horizontal blanking interval $T_B$.

Figure 2:
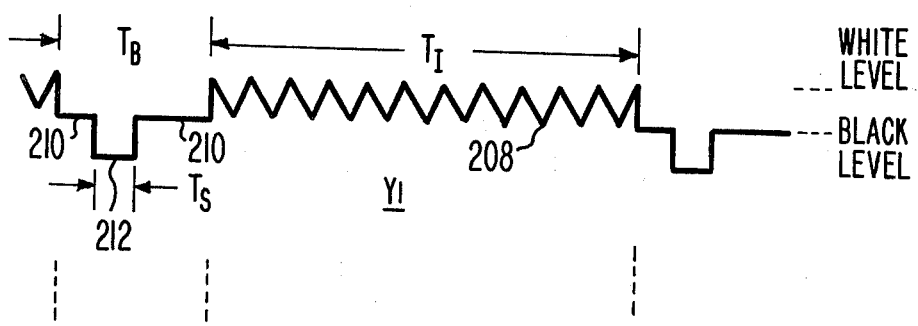
Figure 3:
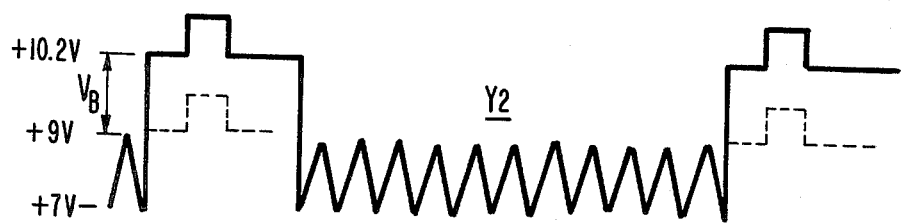
Figure 4:
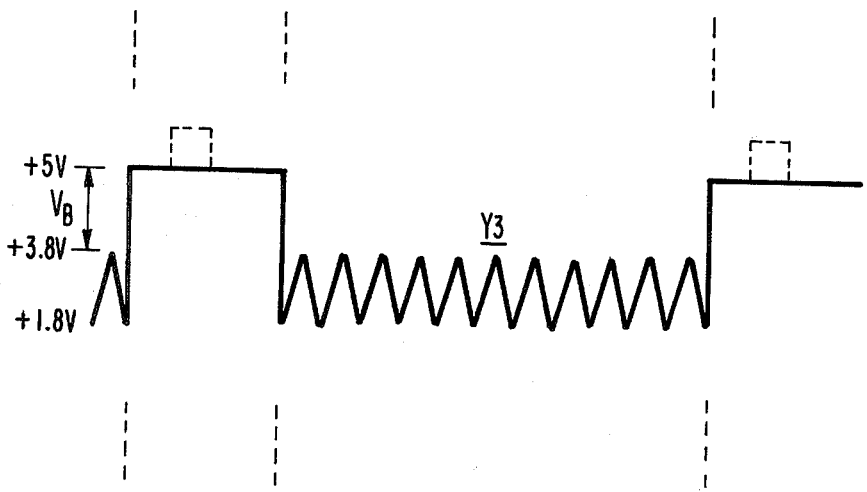

The luminance component of the video output signal from unit 12 is amplified and otherwise translated by a luminance signal processing unit 35 in a luminance channel of the receiver to provide a luminance output signal $Y_1$ (FIG. 2). Luminance signal $Y_1$ comprises an image information portion 208 occurring during an image (horizontal trace) interval $T_I$ and disposed between periodic image blanking portions, occurring during a horizontal image blanking (retrace) interval $T_B$. Each blanking portion comprises a pedestal blanking level 210 occurring during so-called front porch and back porch intervals, and a sync pulse 212 superimposed on the pedestal level and occurring during a sync interval $T_S$. The blanking level approximates a black level of the luminance signal, and a designated white level of signal $Y_1$ corresponds to a maximum expected signal excursion in a direction for producing a white image display.

An amplified, relatively inverted luminance signal appears at a collector output of a video amplifier transistor 40, and at a base input of a PNP emitter follower transistor 41 of substantially unity gain and low output impedance. A source of bias current $I_1$ includes a current determining resistor 51 and a voltage source (+27 volts) coupled to an emitter of transistor 41. Reference signal A is summed with the signal appearing at the collector of transistor 40 to produce a luminance signal $Y_2$ (FIG. 3) at the base of transistor 41, as will be explained.

Clamping signal B is coupled via an isolation diode 48 to a base input of a substantially unity gain emitter follower luminance amplifier transistor 43, and to an emitter of a clamping transistor 42. Clamp transistor 42 is operatively associated with a capacitor 55 which A.C. couples the luminance signal from the emitter of transistor 41 to a base input of transistor 43. Clamping signal B renders transistor 42 conductive and transistor 43 nonconductive during each horizontal blanking (retrace) interval $T_B$. Transistors 42 and 43 are respectively nonconductive and conductive during each horizontal image trace interval $T_I$. Reserve or extra blanking capability during the retrace interval is provided by a current source including a current determining resistor 53 associated with a source of positive voltage (+11 volts).

An amplified, clamped luminance output signal $-Y$ (FIG. 5) from transistor 43 is direct current coupled at low impedance to a kinescope driver stage 60 including low power consumption matrix transistors 62, 64 and 66, each forming a cascode amplifier for respective color difference signals with relatively higher power common base output amplifier transistors 82, 84 and 86, all arranged as shown. The clamped luminance signal $-Y$ is coupled via variable gain adjustment resistors 72, 74 and 76 to emitters of transistors 62, 64 and 66, wherein the luminance signal is matrixed with the D.C. coupled R-Y, B-Y and G-Y color difference signals for ultimately producing $-R$, $-B$ and $-G$ color signals at respective collector outputs of transistors 82, 84 and 86. Cascode driver stage 60 is described in greater detail in a copending U.S. patent application of L. A. Harwood, Ser. No. 728,171 entitled "Video Amplifier" and assigned to the present assignee. The $-R$, $-B$ and $-G$ color signals are suitably applied to control electrodes (e.g., cathodes) of kinescope 90 for reproducing an image in response to the color signals.

Neglecting for the moment D.C. voltage variations due to temperature changes for example, a substantially constant voltage (e.g., approximately +5 volts) appears at each of the base electrodes of matrix transistors 62, 64 and 66. This occurs when the D.C. coupled output signals of chrominance unit 16 are representative of a monochrome signal condition, and also when image signal information is absent during each retrace blanking interval. Accordingly, a voltage $V_E$ corresponding to an average of the emitter voltages of the matrix transistors also is substantially invariant during each retrace interval, since the respective emitter voltages are equal to the base voltages of the matrix transistors less one $V_{BE}$((i.e., the voltage drop across the base-emitter junctions of the matrix transistors, or approximately 0.6 volts).

In operation, clamping signal B forward biases clamp transistor 42 into conduction, and reverse biases transistor 43 out of conduction during each blanking interval. A clamping voltage then appearing at the emitter of transistor 42 substantially equals the average voltage $V_E$ plus the emitter-base voltage drop of transistor 42, or $V_E + 1V_{BE}$. In this example, the matrix transistors are slightly conductive during this time. Also, a small reserve blanking current flows from the reserve blanking circuit including resistor 53 through each of gain control resistors 72, 74 and 76 to prevent the matrix transistors from conducting excessively, and thereby insuring blanking during each blanking interval. The reserve blanking current is sufficiently small so that the voltage drop across resistors 72, 74 and 76 (e.g., approximately sixty millivolts) is considered negligible during this time (the contribution of the base current of transistor 42 to the reserve blanking current also is negligible). Therefore, average voltage $V_E$ also appears at the base of clamp transistor 42 and at the emitter of luminance amplifier transistor 43.

At a time immediately prior to each image trace interval, the base voltage of transistor 43 equals average voltage $V_E$ less the emitter-base voltage drop of transistor 43, or $V_E - 1V_{BE}$. This voltage corresponds to a threshold conduction level at which transistor 43 begins to conduct for providing output signal information current to the matrix transistors during the image interval. Accordingly, in this case a $2V_{BE}$ voltage difference exists between the clamp voltage ($V_E + 1V_{BE}$) at the emitter of transistor 42 during each retrace blanking interval, and the threshold conduction voltage ($V_E - 1V_{BE}$) of transistor 43 during each image trace interval.

Variations in the level of average voltage $V_E$ can be caused by variations in the operating point of the matrix transistors due to ambient temperature changes for instance, and also by a shift in the D.C. level of the signal outputs of chrominance unit 16 due to variations in the operating characteristics of the circuit components or operating supply associated with unit 16. It is noted that both the clamp voltage from transistor 42 and the threshold conduction voltage of transistor 43 "track with" or closely follow variations in the level of average voltage $V_E$. However, the $2V_{BE}$ difference voltage remains substantially constant. This result permits signals to be direct current coupled to the matrix transistors without significant blanking level variations (i.e., brightness variations) attributable to factors of the type mentioned above.

Figure 6:
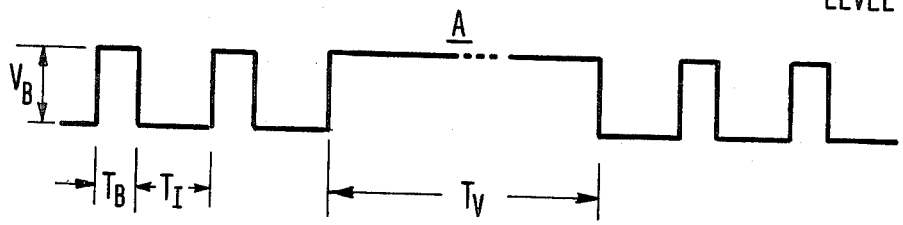
Figure 7:
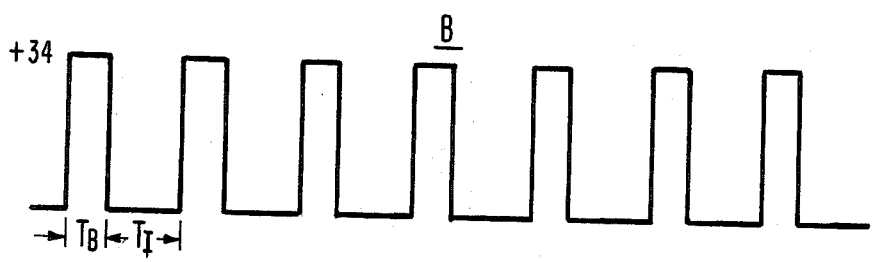

Luminance signal $Y_2$ (an amplified and inverted version of signal $Y_1$) includes a signal component of amplitude $V_B$, which has been added to each blanking portion during interval $T_B$ through summation with signal A (FIG. 6). Amplitude level $V_B$ of signal $Y_2$ substantially corresponds in magnitude to the $2V_{BE}$ difference voltage discussed previously.

Luminance signal $Y_2$ is coupled at low impedance via the emitter-base junction of follower transistor 41 to clamp capacitor 55. It is noted that the luminance signal at the emitter of transistor 41 is similar to signal $Y_2$ (FIG. 3), the devoid or "stripped" of the sync pulse during time $T_S$. The latter result is desired in order to prevent clamping network 42, 55 from responding to the peak amplitude of the sync pulse. The peak amplitude of the sync pulse can be unreliable when used as a level from which a black reference level is derived, since such amplitude can vary from channel to channel (i.e., station to station), and with variations in the operating parameters of preceding intermediate frequency signal processing circuits from receiver to receiver.

The sync pulse is removed from the video signal as a consequence of transistor 41 being rendered non-conductive in response to the sync pulse during interval $T_S$. The positive plate voltage of capacitor 55 discharges rapidly to the blanking level during the "front porch" portion of the luminance signal, and the negative plate voltage of capacitor 55 is fixed by the clamping voltage then appearing at the emitter of transistor 42. This action serves to substantially fix the voltage developed across capacitor 55 at this time. The positive going sync pulse is in a direction to reverse bias transistor 41 out of conduction such that the emitter output of transistor 41 does not respond to, or "follow", the sync pulse amplitude. The fixed voltage then appearing on capacitor 55 assists to prevent the emitter voltage of transistor 41 from rising above the blanking level during the sync interval. The value of bias current $I_1$ is sufficiently small so as not to upset the desired non-conductive condition of transistor 41 during the sync pulse interval.

In essence, transistor 41 serves as a signal limiter or clipper during the sync interval to remove the sync pulse by limiting the peak amplitude of the luminance signal to the blanking interval. The sync pulse therefore is removed from the luminance signal coupled to capacitor 55, without requiring additional circuits including sync gating circuits and the like for this purpose.

The luminance signal is A.C. coupled via capacitor 55 to produce luminance signal $Y_3$ (FIG. 4) at the emitter of transistor 42 and base of transistor 43. Signal $Y_3$ is similar to the luminance signal appearing at the emitter of transistor 41, except that the positive peak amplitude of signal $Y_3$ is clamped to $+5$ volts during the blanking interval due to the conduction of clamp transistor 42, and the values of the respective peak amplitude levels differ due to a voltage offset developed across coupling capacitor 55. The peak-to-peak amplitude (2 volts) of the image information portion occurring during interval $T_I$ remains unimpaired.

Figure 5:
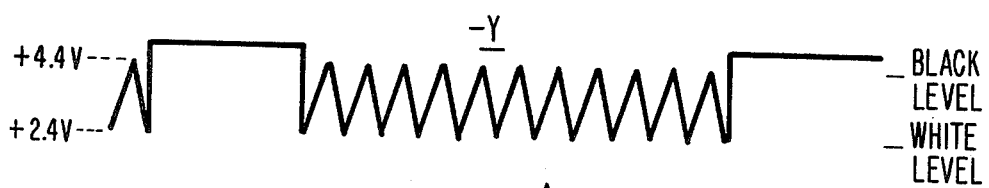

The threshold conduction level at the base of luminance transistor 43 ($+3.8$ volts) coincides with the black level, and transistor 43 conducts during the entire two volt peak amplitude range of luminance signal $Y_3$ (i.e., from the $+3.8$ volt black or blanking level to the $+1.8$ volt maximum expected white level). The entire dynamic range of the luminance signal therefore is reproduced faithfully at the emitter output of transistor 43 as signal $-Y$ (FIG. 5). This result is attributable to the blanking reference pulse of amplitude $V_B$ added during each blanking interval. In the absence of such reference pulse, the peak-to-peak amplitude of the image information portion of the luminance output signal at the emitter of transistor 43 would be restricted as a consequence of the voltage offset across coupling capacitor 55 and the $2V_{BE}$ difference between the clamping level provided by clamp transistor 42 and the threshold conduction level of transistor 43.

Output luminance signal ($-Y$) exhibits an image information portion of a positive peak amplitude ($+4.4$ volts) corresponding to a desired black level of an image to be reproduced. The amplitude of signal $-Y$ during each blanking interval $T_B$ is slightly more positive than the peak amplitude occurring during time $T_I$, and corresponds to a "blacker-than-black" condition. This "blacker-than-black" level is attributable to the auxiliary blanking current supplied via resistor 53 to insure that kinescope 90 is blanked during each blanking interval. Otherwise, variations in the operating parameters of kinescope 90 and associated circuits (e.g., due to tolerance variations from receiver to receiver) could cause kinescope 90 to conduct slightly during the blanking intervals.

The clamping arrangement of FIG. 1 serves to establish a desired blanking or black level of the luminance signal D.C. coupled to kinescope driver stage 60 without impairing the peak-to-peak amplitude range of the luminance signal. At the same time, a desired reference bias level is established for the matrix transistors of the kinescope driver stage during the blanking intervals, without a need for additional clamping circuits for this purpose.

It is noted that the particular illustrated arrangement of clamp transistor 42 and luminance amplifier transistor 43 represents a version of a transmission gate. During each retrace interval, a clamping signal transmission path at relatively high input impedance and low output impedance is provided from the emitter of matrix transistors 62, 64, 66 through the base-emitter junction of transistor 42 to the negative plate of capacitor 55. During each trace interval, a luminance signal transmission path at relatively high input impedance and low output impedance is provided from the negative plate of capacitor 55 through the base-emitter junction of transistor 43 to the matrix transistors.

Also associated with the clamping circuit including transistor 42 and capacitor 55 is a network including a current bleeder resistor 46 and a source of negative voltage ($-30$ volts) for providing a current $I_2$. Current $I_2$ serves to "bleed" charge from the negative plate of capacitor 55, and for this purpose the value of current $I_2$ is chosen to exceed a maximum expected value of average base current of transistor 43. In this example, current $I_1$ is greater than current $I_2$ to insure that transistor 41 remains conductive during each trace interval.

In the illustrated circuit with the values shown, a desired offset voltage across capacitor 55 is maintained by the coaction of currents $I_1$ and $I_2$, the emitter currents of transistors 41 and 42, and the clamping signal current supplied as need via diode 48. The voltage on capacitor 55 tends to increase (i.e., the negative plate voltage decreases) during each trace interval when current $I_2$ exceeds the average base current of transistor 43. During normal conditions when capacitor 55 develops an excess positive charge due to current $I_2$ (i.e., the charge on the negative plate of capacitor 55 is depleted), this excess positive charge is reduced during the front and back porch intervals via the emitter current of transistor 41 and the clamping signal current.

While the present invention has been described in terms of a preferred embodiment, it should be recognized that various modifications may be made without departing from the scope of the invention. It is also noted that the amplitude levels of the disclosed signal waveforms, although typical, are illustrative in nature and are not drawn to scale in the interest of clarity.

It is furthermore noted that the magnitude of the reference pulses can be tailored to suit the requirements of a particular system. Illustratively, if the magnitude of the voltage appearing across the variable drive control resistors 72, 74 and 76 during each blanking interval is not considered negligible in a given case, the clamp voltage then appearing at the emitter of transistor 42 during each blanking interval would be greater by a corresponding amount (i.e., greater than $V_E + 1V_{BE}$ as in the illustrated embodiment). In this instance, the magnitude of the reference pulses should be increased a corresponding amount. Analogous observations apply if additional voltage dropping elements are coupled between the emitters of the matrix transistors and the base of clamp transistor 42.

Clamp transistor 42 can be replaced by a semiconductor diode if the driving point impedance (represented by the effective emitter impedances of matrix transistors 62, 64 and 66 in this case) is sufficiently low. Semiconductor devices of opposite conductivity type from those shown also can be employed. For example, clamp device 42 may comprise an NPN transistor with base and emitter electrodes coupled in the same fashion as transistor 42, and a collector electrode coupled to a positive operating supply. In this case, appropriate clamping signals would be coupled to the base of the NPN clamp transistor for rendering the clamp transistor respectively conductive and non-conductive during each retrace and trace interval.

Also, brightness control can be effected by varying the base voltage of clamp transistor 42, to thereby vary the clamping reference level and consequently the brightness of a reproduced image.

What is claimed is:

1. In a video signal processing system including a kinescope for reproducing an image in response to an image representative video signal, said video signal including periodic image blanking intervals disposed between periodic image intervals containing image information signals, said blanking intervals containing a sync pulse superimposed on a pedestal blanking level during a sync interval, apparatus comprising:
   means for clamping said video signal to a reference voltage during said blanking intervals;
   means, having a threshold conduction level different from said reference voltage, for coupling said clamped video signal to said kinescope when said threshold level is exceeded;
   means for providing periodic blanking reference pulses coincident with said blanking intervals, said reference pulses being of a magnitude substantially equal to the difference between said reference voltage and said threshold conduction level of said coupling means; and
   means for combining said reference pulses with said video signal prior to clamping.

2. Apparatus according to claim 1, wherein:
   said reference pulses occur during horizontal and vertical image blanking intervals of said video signal.

3. Apparatus according to claim 1, and further comprising:
   capacitive signal coupling means operatively associated with said clamping means for providing said clamped video signal.

4. Apparatus according to claim 3, wherein:
   said clamping means and said coupling means each comprise controllable conduction semiconductor devices having an input and an output.

5. Apparatus according to claim 4 and further comprising signal translating means for coupling signals from said coupling means to said kinescope; wherein:
   said input and output of said clamping means are respectively coupled to said signal translating means and to said capacitive means for defining a direct current coupling path from said signal translating means to said capacitive means during said blanking intervals; and
   said input and output of said coupling means are respectively coupled to said capacitive means and to said signal translating means for defining a direct current coupling path from said capacitive means to said signal translating means during said image intervals.

6. Apparatus according to claim 5, wherein:
   said clamping means and said coupling means comprise a clamp transistor and an amplifier transistor, respectively.

7. Apparatus according to claim 6, wherein:
   said transistors are of similar conductivity type and arranged in emitter follower configuration.

8. Apparatus according to claim 7, wherein:
   said clamp transistor and amplifier transistor each have a base input electrode, an emitter output electrode and a common collector electrode; and
   base-emitter junctions of said transistors are connected in parallel for oppositely directed current flow.

9. Apparatus according to claim 5, said system comprising a color television signal processing system including means for providing a plurality of color difference signals, therein:
   said signal translating means includes further combining means for combining said clamped video signal with separate ones of said color difference signals to produce color representative output signals, and means for coupling said color output signals to said kinescope; and
   said clamping reference voltage is derived from said further combining means.

10. Apparatus according to claim 9, wherein:

said further combining means comprises a plurality of semiconductor devices each having a first input direct current coupled to separate ones of said color difference signals, a second input direct current coupled to said clamped luminance signal, and an output for providing said color representative signals.

11. Apparatus according to claim 10, wherein:
said semiconductor devices comprise like conductivity type transistors each having a first base input, a second emitter input, and a collector output.

12. Apparatus according to claim 11, wherein:
said transistors are each arranged in cascode amplifier configuration with respect to said color difference signals.

13. Apparatus according to claim 11, wherein:
said emitters of said transistors are direct current coupled to said clamping means; and
said clamping reference voltage is derived from the emitter voltages of said transistors.

14. Apparatus according to claim 1, and further comprising:
input video signal coupling means;
capacitive means having an input coupled to said input means and an output coupled to said clamping means; and
a semiconductor device included in said input means, said device being rendered non-conductive during said sync interval in response to said video signal coupled via said input means, for limiting the amplitude of said video signal during said blanking intervals to said blanking level, such that said sync pulse is removed from said video signal coupled to said input of said capacitive means.

15. In a video signal processing system including a kinescope for reproducing an image in response to an image representative video signal, said video signal including periodic image blanking intervals disposed between periodic image intervals containing image information signals, each of said blanking intervals containing a blanking pedestal level and a sync pulse superimposed on said blanking pedestal level during a sync interval within said blanking intervals, apparatus comprising:
capacitive means having an input and an output;
input means for coupling said video signal to said input of said capacitive means;
means coupled to said output of said capacitive means and operatively associated therewith during said blanking intervals for clamping said video signal to a reference voltage during said blanking intervals;
output means for coupling said clamped video signal to said kinescope; and wherein said input means comprises
controllable conduction means being rendered non-conductive during said sync interval in response to said video signal coupled via said input means, for limiting the amplitude of said video signal during said blanking intervals to said blanking level, such that said sync pulse is removed from said video signal coupled to said input of said capacitive means.

16. Apparatus according to claim 15, wherein:
said controllable conduction means comprises a transistor.

17. Apparatus according to claim 16, wherein:
said transistor has base, emitter and collector electrodes and is arranged in emitter follower configuration.

* * * * *